April 5, 1966     A. DUNCAN     3,244,251
ANTI-ROLL BARS FOR TRACTORS
Filed Feb. 24, 1964     4 Sheets-Sheet 1

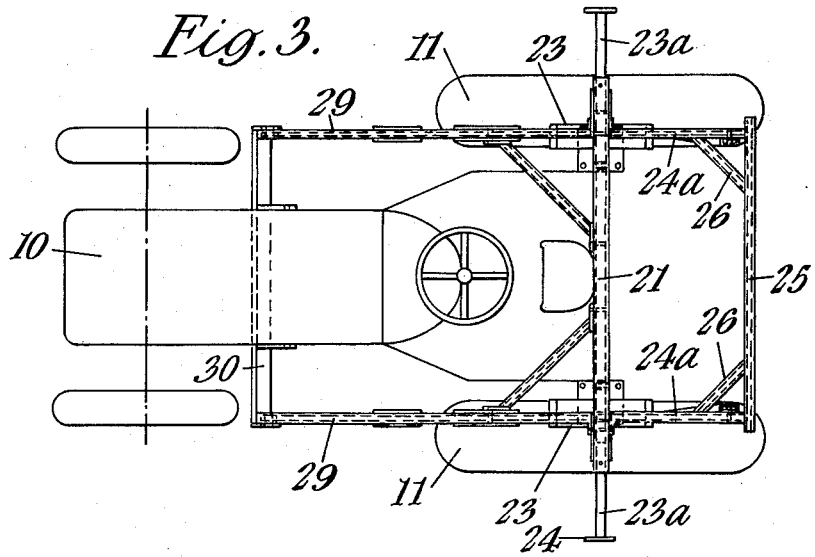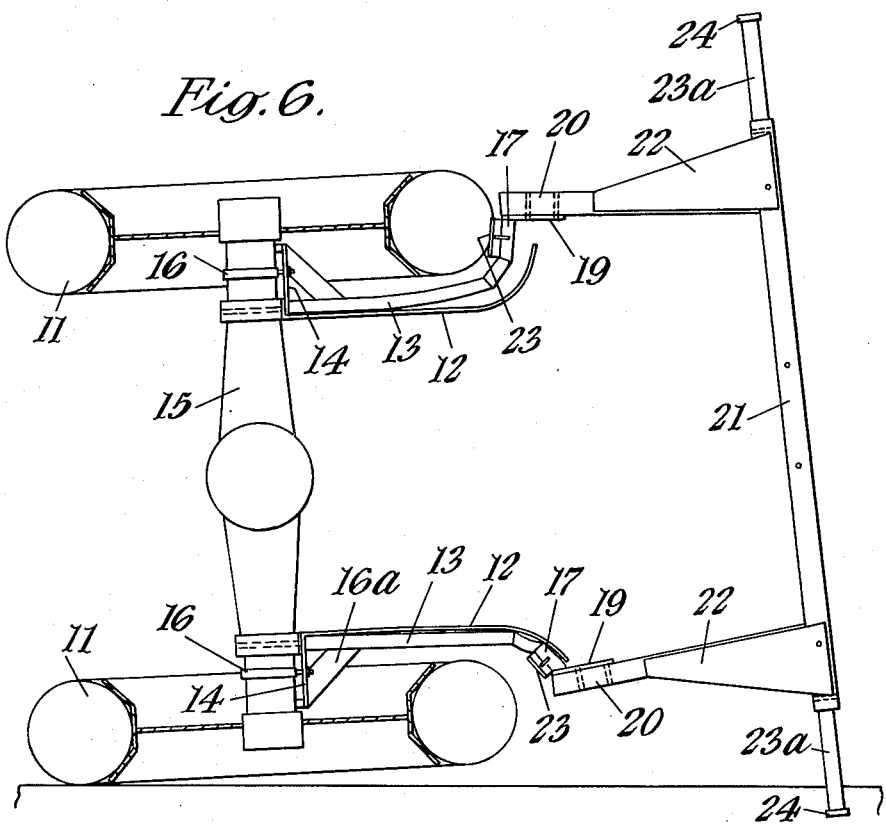

United States Patent Office 3,244,251
Patented Apr. 5, 1966

3,244,251
ANTI-ROLL BARS FOR TRACTORS
Alexander Duncan, Inchbroom, Nigg, Scotland
Filed Feb. 24, 1964, Ser. No. 346,683
Claims priority, application Great Britain, June 14, 1963, 23,747/63
5 Claims. (Cl. 180—82)

This invention has reference to anti-roll bars for tractors.

Tractors, by reason of the undulating ground over which they occasionally travel, are liable to fall on their side and thereafter to roll. When this occurs not only is the tractor likely to be damaged but there is danger of serious injury or death to the tractor driver.

With a view to preventing a tractor rolling after it has turned on its side it is known to provide an anti-roll bar secured to and extending transversely of the roof of a driver's cabin fitted to the tractor, with the ends of the bar projecting beyond the roof of the cabin. The sides of the cabin, which are substantially vertical, constitute the supports for the anti-roll bar. Should a tractor having a cabin with such anti-roll bar fitted thereto turn on its side the cabin will probably be badly damaged and the driver injured.

The present invention has for its object to provide an anti-roll bar assembly which will more effectively prevent rolling of a tractor, which is less liable to become damaged and will more effectively protect the driver.

According to the present invention a tractor is provided with an anti-roll assembly comprising an anti-roll bar and side supporting uprights therefor, each upright having a lower part mounted on an outer end of the rear axle casing and extending between the adjacent wheel and its guard, and having at its upper end a lateral extension which passes between the tread of the wheel and its guard, such extension forming or having secured thereto a shoe, and an upper part extending upwardly from the outer end of the lateral extension, said bar being rigid with the upper ends of the supports. The construction is such that in the event of the tractor falling on its side the thrust on the bar causes the uprights to be slightly distorted so that what now constitutes the upper shoe bears on the tread of the adjacent tire and thereby restricts further bending of the supporting uprights.

A preferred embodiment of the invention will now be described with reference to the accompanying drawings wherein:

FIGURE 3 is a plan view of FIGURE 1;

FIGURE 6 is a view corresponding to FIGURE 5 but showing the position of the wheels and anti-roll bar assembly when the tractor has turned over on its side.

Figure 1:
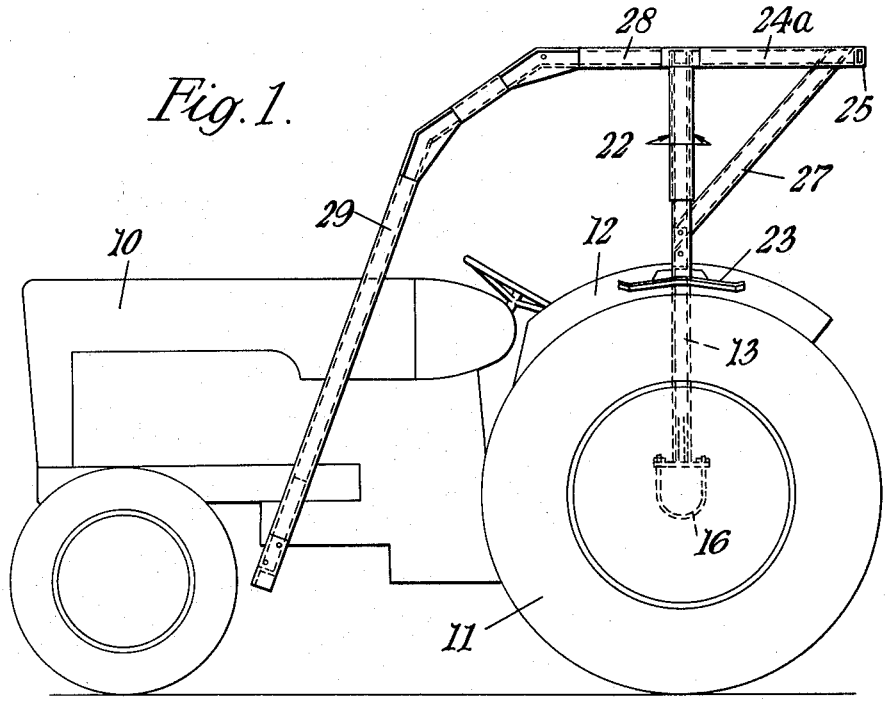
FIGURE 1 is a side elevation of a tractor with a preferred construction of the improved anti-roll bar assembly fitted thereto.
Figure 2:
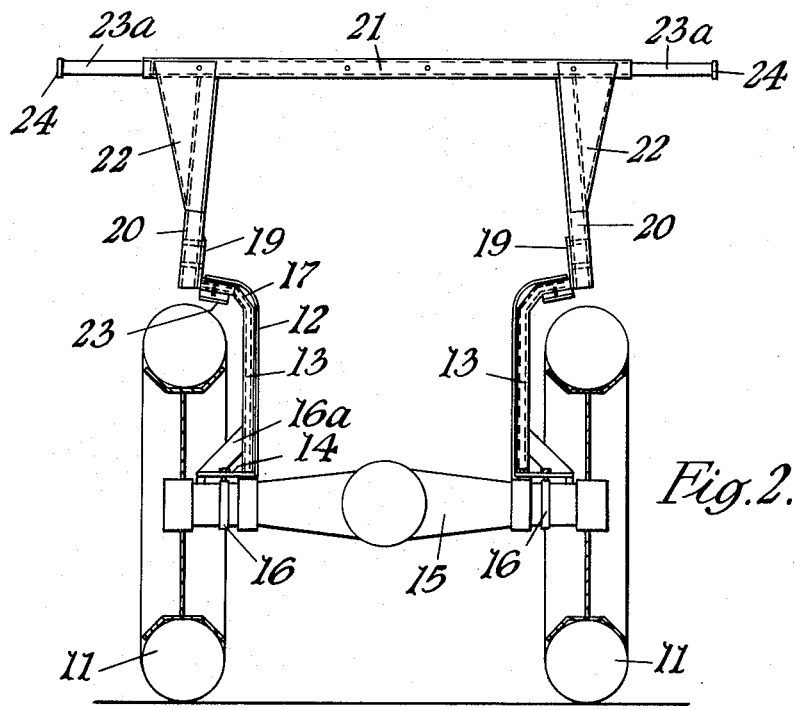
FIGURE 2 is an end view of FIGURE 1 looking to the left.
Figure 4:
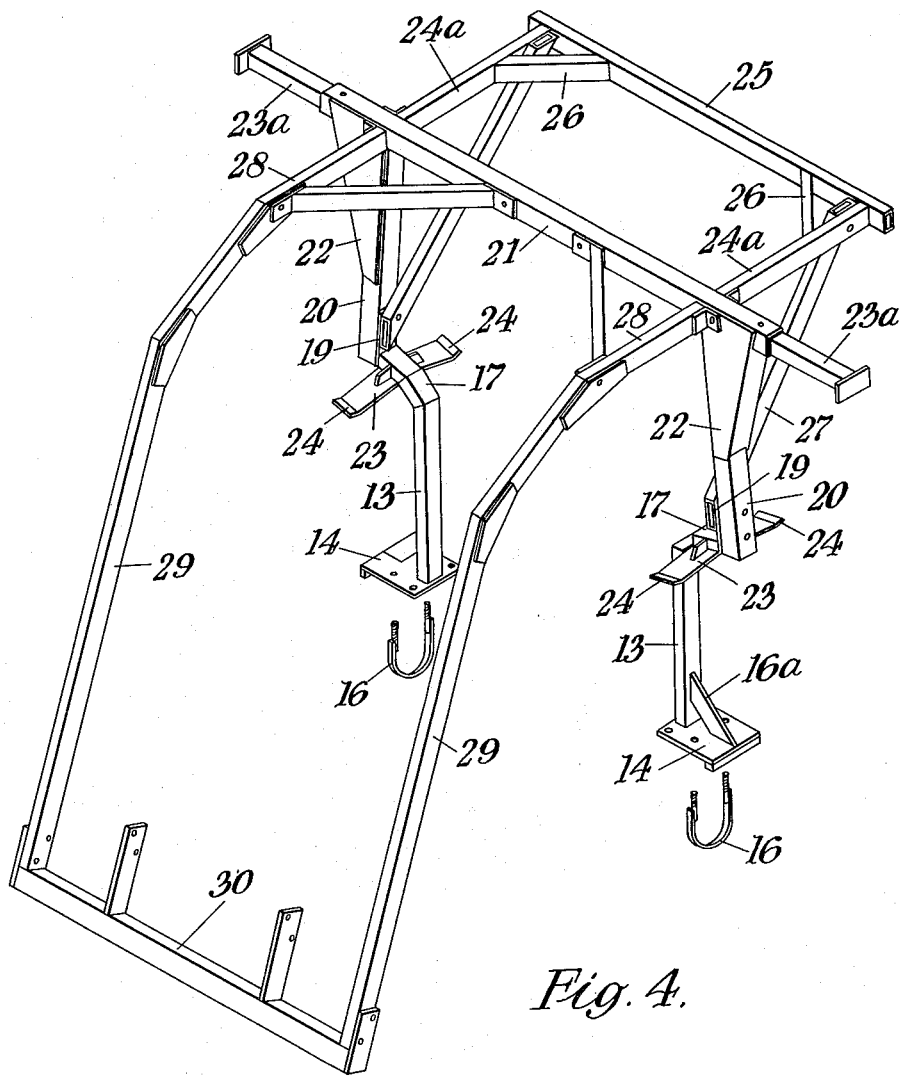
FIGURE 4 is a perspective view of the anti-roll bar assembly.

In the drawings 10 denotes the tractor, 11 the rear wheels and 12 the usual wheel guards.

Figure 5:
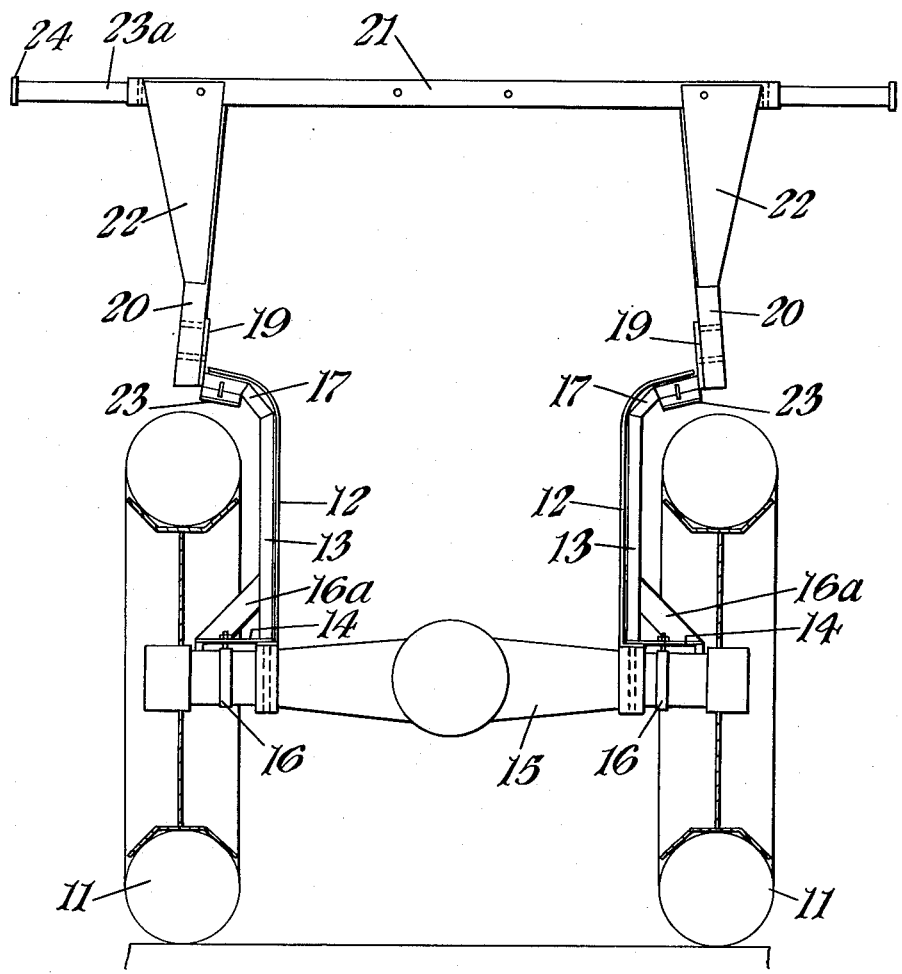
FIGURE 5 shows to a larger scale an end view of the rear axle casing of the tractor, the rear wheels in section and the anti-roll bar assembly fitted to said casing.

The anti-roll bar assembly includes two side uprights each formed of a lower part and an upper part. Each lower part, designated 13, has a base 14 and each base is bolted to an end of rear axle casing 15 by means of a U bolt 16 and nuts or other means. A strut 16a extends between the foot of each upright and the base. The lower part 13 of each support extends upwardly between the adjacent wheel 11 and the guard 12 therefor. As shown clearly in FIGURES 5 and 6 such parts of the supports should preferably lie closely adjacent to the wheel guards.

The uprights at their upper ends are fabricated as at 17 to conform to the transverse section of the rear wheel guards 12, the fabricated ends extending over the rear wheels below and beyond the wheel guards. The uprights and their fabricated ends 17 are of box section and fitted in said ends and secured thereon by bolts and nuts are the lateral extensions of vertical brackets 19. To each bracket 19 is bolted a further upright 20 likewise of box section, the further uprights being splayed inwardly and connected to an anti-roll bar or cross bar 21 likewise of box section and which, at its two ends, extends beyond the uprights and is strengthened by means of gusset plates 22.

Inserted in the ends of the cross bar are the inner ends of rods 23a the outer ends of which extend substantially beyond the ends of the cross bar. The outer extremities of the rods have base plates or feet 24 and the rods 23a are removable.

To the underside of each of the laterally extending fabricated ends 17 is connected a tire bearing shoe 23 which extends between a wheel guard and the tire protected by such guard. In a section parallel to the plane of the wheel the shoes conform roughly to the curvature of the wheel and are angled upwardly at their two ends as at 24.

To the rear face of tthe bar 21 are secured two rearwardly extending horizontal arms 24a interconnected by a cross bar 25, the three sided frames so formed being strengthened by reinforcing members 26 and struts 27 connected to the uprights 20.

Connected to the front face of the bar 21 are horizontal forwardly extending fabricated arms 28 to which are connected downwardly and forwardly extending legs 29, the lower ends of which are interconnected by a cross member 30. The legs are positioned one on each side of the tractor and the cross member is positioned below the tractor to which it is secured by any suitable means.

Normally the shoes are held clear of the treads of the wheels but should the tractor turn on its side, as is shown in FIGURE 6, one of the rods 23a will strike the ground and the uprights will be sufficiently distorted so that what is now the uppermost shoe bears hard on the tread of the upper wheel.

Further bending of the upright which is now uppermost can now take place only in further upright 20 and by reason of the upright being relatively short and because of the gussets 22 such further bending is negligible. Thus the assembly, after a shoe bears on the tread, may be regarded as rigid and effectively prevents rolling of the tractor. Little damage, if any, is likely to occur to the assembly and the driver will be protected thereby.

The tractor may be provided with a cabin, sufficient space being provided between the sides of the tractor and the wheel guards to accommodate, if necessary, the lifting arms of ancillary equipment driven by the tractor engine. By reason of the lower parts of the vertical supports being accommodated between the wheels and guards they do not interfere with such equipment.

The rearwardly projecting frame and the side legs 29 lend rigidity to the anti-roll bar assembly and in the event of the tractor tilting backwards the assembly prevents it from tilting completely over.

When the anti-roll bar assembly is not required the rods 23a may be removed to reduce the over-all width of the assembly.

The invention is not to be confined to any strict conformity to the showings in the drawings but changes or modifications may be made therein so long as such changes or modifications mark no material departure from the spirit and scope of the appended claims.

What I claim is:

1. A tractor having a rear axle casing, rear wheels and a guard for each wheel and provided with an anti-roll bar assembly, comprising an anti-roll bar and side supporting uprights therefor, each upright having a lower part, said lower part having upper and lower ends with the lower end being mounted on the rear axle casing and extending between the adjacent rear wheel and the guard therefor, a lateral extension at the upper end of each lower part passing between the tread of the rear wheel and the guard therefor and having an outer end, a shoe for the extension, an upper part extending upwardly from the outer end of the lateral extension and the anti-roll bar being rigidly secured to said upper part with its respective ends projecting beyond the rear wheels so that in the event of the tractor falling on its side the thrust on the projecting end of the bar causes the uprights to be slightly distorted so that what now constitutes the upper shoe bears on the tread of the adjacent wheel thereby restricting further bending of the supporting uprights.

2. A tractor having a rear axle casing, rear wheels and a guard for each wheel and provided with an anti-roll bar assembly, comprising an anti-roll bar and side supporting uprights therefor, each upright having a lower part, said lower part having upper and lower ends with the lower end being mounted on the rear axle casing and extending between the adjacent rear wheel and the guard therefor, a lateral extension at the upper end of each lower part passing between the tread of the rear wheel and the guard therefor and constituting a shoe, said extension having an outer end, an upper part extending upwardly from the outer end of the lateral extension and the anti-roll bar being rigidly secured to said upper parts with its respective ends projecting beyond the rear wheels so that in the event of the tractor falling on its side the thrust on the projecting end of the bar causes the uprights to be slightly distorted so that what now constitutes the upper lateral extension bears on the tread of the adjacent wheel thereby restricting further bending of the supporting uprights.

3. The tractor as claimed in claim 1 including forwardly and downwardly extending legs secured to the anti-roll bar and to the tractor and a frame extending rearwardly from said bar, with the legs adding rigidity to the assembly and the frame preventing the tractor from tipping completely backwards.

4. An anti-roll bar assembly for a tractor provided with a rear axle casing, rear wheels and a guard for each wheel, comprising an anti-roll bar and side supporting uprights therefor, each upright having a lower part, said lower part being secured to the rear axle casing and extending upwardly between the adjacent wheel and the guard therefor, an outwardly projecting lateral extension at the upper end of each lower part passing between the wheel and the guard therefor and constituting a shoe, and an upper part extending upwardly from the lateral extension and having an upper end rigidly secured to the anti-roll bar, said anti-roll bar being of such length as to have its respective ends project beyond the rear wheels so that in the event of the tractor falling on its side, the thrust on the projecting end of the bar causes the uprights to be slightly distorted so that what now constitutes the upper shoe bears on the tread of the adjacent wheel thereby restricting further bending of the supporting uprights.

5. An anti-roll bar assembly for a tractor provided with a rear axle casing, rear wheels and a guard for each wheel, comprising an anti-roll bar and side supporting uprights therefor, each upright having a lower part, said lower part being secured to the rear axle casing and extending upwardly between the adjacent wheel and the guard therefor, an outwardly projecting lateral extension at the upper end of each lower part passing between the wheel and the guard therefor, a shoe secured to the extension, and an upper part extending upwardly from the lateral extension and having an upper end rigidly secured to the anti-roll bar, said anti-roll bar being of such length as to have its respective ends project beyond the rear wheels so that in the event of the tractor falling on its side, the thrust on the projecting end of the bar causes the uprights to be slightly distorted so that what now constitutes the upper shoe bears on the tread of the adjacent wheel thereby restricting further bending of the supporting uprights.

References Cited by the Examiner

UNITED STATES PATENTS

| | | | |
|---|---|---|---|
| 2,729,462 | 1/1956 | Maybrier | 280—150 |
| 2,783,056 | 2/1957 | Belk | 280—150 |
| 2,828,970 | 4/1958 | Ivey | 280—150 |
| 2,921,799 | 1/1960 | Hatten | 280—150 |

BENJAMIN HERSH, *Primary Examiner.*

LEO FRIAGLIA, *Examiner.*

W. A. MARCONTELL, *Assistant Examiner.*